(12) United States Patent
Cupal et al.

(10) Patent No.: US 7,769,141 B2
(45) Date of Patent: Aug. 3, 2010

(54) METHOD AND SYSTEM FOR VISUAL SPATIAL CALLER IDENTIFICATION

(75) Inventors: Matthew D. Cupal, Providence, UT (US); Joseph N. Romriell, Alpine, UT (US); Allen Shupe, Sandy, UT (US); James L. Sorenson, Salt Lake City, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 978 days.

(21) Appl. No.: 11/233,612

(22) Filed: Sep. 23, 2005

(65) Prior Publication Data

US 2007/0081646 A1  Apr. 12, 2007

(51) Int. Cl.
*H04M 11/00* (2006.01)
(52) U.S. Cl. .................... 379/52; 379/376.01
(58) Field of Classification Search .......... 379/52, 379/142.17, 142.06, 142.01, 376.01, 373.02
See application file for complete search history.

(56) References Cited

U.S. PATENT DOCUMENTS

| | | | |
|---|---|---|---|
| 4,365,238 A | 12/1982 | Kollin | |
| 4,379,210 A | 4/1983 | Sparber | |
| 4,578,542 A | 3/1986 | Alderman | |
| 4,608,457 A | 8/1986 | Fowler et al. | |
| 4,707,855 A | 11/1987 | Pasinski et al. | |
| 4,833,709 A * | 5/1989 | Pasinski et al. | 379/376.01 |
| 4,878,843 A | 11/1989 | Kuch | |
| 4,926,459 A | 5/1990 | Advani et al. | |
| 4,951,311 A | 8/1990 | Sterr | |
| 4,953,205 A | 8/1990 | Yang | |
| 5,280,523 A | 1/1994 | Lee | |
| 5,404,399 A * | 4/1995 | Finamore | 379/376.01 |
| 5,570,421 A | 10/1996 | Morishima | |
| 5,576,690 A | 11/1996 | Waugh et al. | |
| 5,602,908 A * | 2/1997 | Fan | 379/199 |
| 5,686,881 A | 11/1997 | Ridout | |
| 5,877,676 A | 3/1999 | Shankarappa | |
| 5,890,120 A | 3/1999 | Haskell et al. | |
| 5,990,878 A | 11/1999 | Ikeda et al. | |
| D421,225 S | 2/2000 | Kelley | |
| 6,116,907 A | 9/2000 | Baker et al. | |
| 6,204,974 B1 | 3/2001 | Spitzer | |
| 6,229,430 B1 | 5/2001 | Smith Dewey | |
| 6,317,716 B1 | 11/2001 | Braida et al. | |
| 6,349,001 B1 | 2/2002 | Spitzer | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,456,706 B1 * | 9/2002 | Blood et al. | 379/188 |
| 6,618,099 B1 | 9/2003 | Spitzer | |
| 6,690,955 B1 * | 2/2004 | Komiyama | 379/142.17 |
| 6,693,630 B1 | 2/2004 | Siskind | |
| 6,714,637 B1 | 3/2004 | Kredo | |

(Continued)

*Primary Examiner*—Stella L Woo
(74) *Attorney, Agent, or Firm*—TraskBritt

(57) ABSTRACT

A method, system and device for visually spatial caller identification includes a caller identification visual alerting device configured to capture current caller identification information from an incoming call. A stored caller identification list stores a plurality of entries of reference caller identification information and a corresponding respective plurality of entries of spatial visual indicator patterns. The reference caller identification information is matched with the current caller identification information. The caller identification visual alerting device further includes a spatial visual indicator configured to activate a plurality of illuminatable elements according to one of the plurality of spatial visual indicator patterns.

26 Claims, 6 Drawing Sheets

U.S. PATENT DOCUMENTS

| | | |
|---|---|---|
| 6,724,354 B1 | 4/2004 | Spitzer et al. |
| 6,775,014 B2 | 8/2004 | Foote et al. |
| 6,882,713 B2 * | 4/2005 | Sakai et al. ............ 379/142.06 |
| 7,076,276 B2 * | 7/2006 | Kemppinen ............ 379/373.02 |
| 7,167,195 B2 * | 1/2007 | Kimata et al. ............ 348/14.16 |
| 2002/0177112 A1 | 11/2002 | Heller |
| 2002/0196913 A1 * | 12/2002 | Ruckart ................... 379/88.19 |
| 2004/0213401 A1 * | 10/2004 | Aupperle et al. ............ 379/372 |
| 2005/0031106 A1 * | 2/2005 | Henderson ............. 379/142.17 |
| 2005/0151489 A1 * | 7/2005 | Lys et al. ..................... 315/308 |

* cited by examiner

| 358 CALLER IDENTIFICATION LIST ||
|---|---|
| 362 REFERENCE CALLER IDENTIFICATION | 364 SPATIAL VISUAL INDICATOR PATTERN |
| (201) 555-1212 | CHASER-ONE OFF-SLOW |
| (302) 555-1219 | CHASER-TWO OFF-FAST |
| (405) 123-4567 | SOLID-NO BLINK |
| (605) 987-6543 | SOLID-SLOW BLINK |
| (123) 765-4321 | SOLID-FAST BLINK |
| (987) 654-3210 | CHASER-ALTERNATING FORWARD/REVERSE-SLOW |

*FIG. 7*

METHOD AND SYSTEM FOR VISUAL SPATIAL CALLER IDENTIFICATION

BACKGROUND OF THE INVENTION

1. Field of the Invention

The present invention relates to visual signaling and, more particularly, to visually signaling discernible information to persons more reliant on visual indications, such as hearing-impaired persons.

2. State of the Art

The use of indicators for identifying the activation of a device is commonplace. One predominant form of indicators utilizes an audible or sound-based mechanism for providing notification to a user. However, some persons may have impaired hearing capabilities and may even be completely deaf to audible indicators. Accordingly, such individuals are at a distinct disadvantage to detect and respond to such audible indicating devices.

One such device that has traditionally relied upon an audible indicator is a telephone or similar telecommunications device. Such devices have conventionally utilized a bell or other ringing device for notification to a user of an incoming call. For hearing-impaired users, or in environments that are not conducive to audible indicator detection, visual indicators have been developed. One known visual indication approach utilized by hearing-impaired users for identifying an incoming telephone call is illustrated with reference to FIG. 1. This prior approach connects a telephone 100 through a coupling circuit 102 to a room lamp 104 or other light source. The coupling circuit 102, upon detection of a telephone "ring" signal on the network 106, causes, for example, a room light or lamp 104 to flash repeatedly when a ringing voltage or other signal designates an incoming call.

In such applications and to the hearing-impaired community, telephone-coupling circuits and single light source visual indicator have come to be known as "flashers." Flashers or visual indicators may be implemented as a single light source located on or near the telephone or may be coupled to a more generally present light source such as a light bulb or lamp in a room inhabited by a hearing-impaired user. While such visual indicators provide notification to a user thereof, such visual indicators are informationally "one dimensional" in that they provide only a notification of the occurrence of an event (i.e., the ringing of an incoming call).

While visual indicators exist that provide a visual indication of the origin of, for example, an incoming call, such visual notifications are generally not adequately able to alert and may readily go unnoticed. For example, FIG. 2 illustrates a conventional telephone 120 configured with a caller identification display 122 that provides a visual notification of an incoming call and even provides information correlated to the calling party. However, the caller identification display 122 is configured to provide correlated information of the calling party but is not adequately visually alerting to draw attention to the telephone device. Therefore, there is a need to provide an adequately visually alerting mechanism further configured to provide more information to a hearing-impaired user through a visual indicator.

BRIEF SUMMARY OF THE INVENTION

A method, system and device for a visually spatial caller identification is provided. In one embodiment, a caller identification visual alerting device includes incoming caller identification logic configured to capture current caller identification information from an incoming call. A stored caller identification list is configured to store a plurality of entries of reference caller identification information and a corresponding respective plurality of entries of spatial visual indicator patterns. The reference caller identification information is matched with the current caller identification information. The caller identification visual alerting device further includes a spatial visual indicator configured to activate a plurality of illuminatable elements according to one of the plurality of spatial visual indicator patterns corresponding to one of the plurality of reference caller identification information when matched to the current caller identification information.

In another embodiment of the present invention, a visual caller identification telephone is provided. The visual caller identification telephone includes a telephone transceiver configured to receive an incoming call and a caller identification visual alerting device. The caller identification visual alerting device includes incoming caller identification logic configured to capture current caller identification information from an incoming call and a stored caller identification list configured to store a plurality of entries of reference caller identification information and a corresponding respective plurality of entries of spatial visual indicator patterns. The reference caller identification information is matched with the current caller identification information and the spatial visual indicator patterns are uncorrelated to the reference caller identification information. The visual caller identification telephone further includes a spatial visual indicator configured to activate a plurality of illuminatable elements according to one of the plurality of spatial visual indicator patterns corresponding to one of the plurality of reference caller identification information when matched to the current caller identification information.

In yet another embodiment of the present invention, a method of indicating an incoming call is provided. Current caller identification information is captured from the incoming call and compared with a stored caller identification list configured to store therein a plurality of entries of reference caller identification information and a corresponding respective plurality of entries of spatial visual indicator patterns. When the current caller identification information matches the one of the plurality of reference caller identification information, a plurality of illuminatable elements is activated according to the spatial visual indicator patterns.

BRIEF DESCRIPTION OF THE SEVERAL VIEWS OF THE DRAWINGS

In the drawings, which illustrate what is currently considered to be the best mode for carrying out the invention:

FIG. 7 is a detailed diagram of exemplary data elements within a caller identification list, in accordance with an embodiment of the present invention.

DETAILED DESCRIPTION OF THE INVENTION

Figure 1:
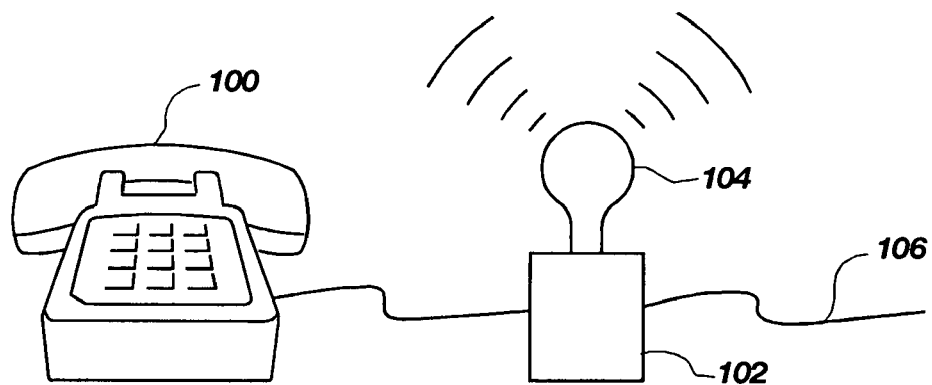
FIG. 1 illustrates a conventional telephone flasher, in accordance with the prior art.
Figure 2:
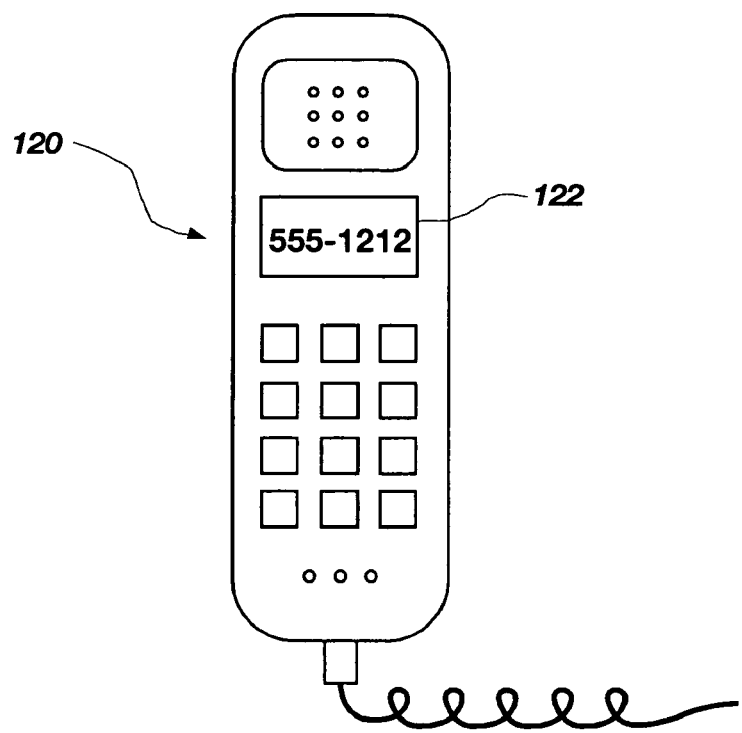
FIG. 2 illustrates conventional caller identification on a telephone device, in accordance with the prior art.
Figure 3:
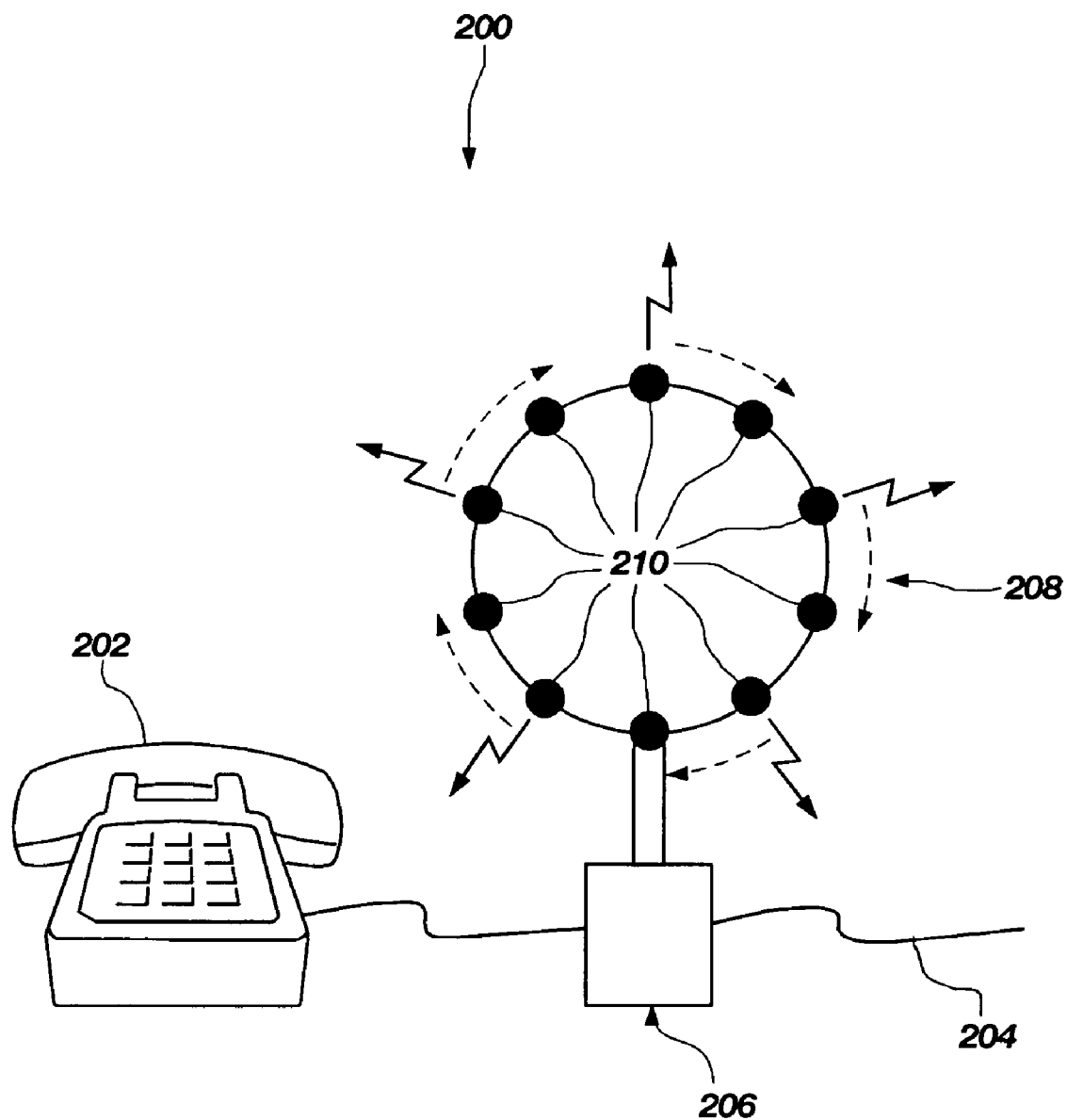
FIG. 3 illustrates a two dimensional visual indicator configured to provide a visual indication and convey information indicative of the specific activation of the device, in accordance with one embodiment of the present invention.

FIG. 3 illustrates a visual indicator telephone system, in accordance with an embodiment of the present invention. As previously stated, visual indicators for conventionally audible indicating devices provide utility to hearing-impaired individuals who are physically incapable of detecting audible sounds and to individuals in a noisy work environment. In accordance with an embodiment of the present invention, a visual indicator telephone system 200 includes general telephony capability illustrated herein as a telephone 202. Telephone 202 facilitates full duplex conversation between a calling party and a called party. In one embodiment, telephone 202 may be configured as a conventional telephone while in a separate embodiment, telephone 202 may be configured as a videophone for facilitating an exchange of sign language or other hearing-impaired signaling techniques. It should be noted that while the utility and application of the various embodiments of the present invention are described with reference to a hearing-impaired environment, the invention also finds application to any environment where a visual indicator may be helpful or desirable.

The visual indictor telephone system 200 may be connected to various types of communication networks 204, examples of which include a public switched telephone network (PSTN) as well as data networks such as an IP network. Also coupled to the network 204 is a spatial visual indicator device 206 configured to identify an incoming call and correlate the incoming current caller identification information with entries in a stored caller identification list. The stored caller identification list is configured to store a plurality of entries of reference caller identification information and a corresponding respective plurality of entries of spatial visual indicator patterns which are uncorrelated to the incoming current caller identification information. The spatial visual indicator patterns are mapped or assigned to reference caller identification information but the spatial visual indicator patterns do not render a specific visual pattern that contains the information of the current caller identification information.

When the spatial visual indicator device 206 detects a match between the current caller identification information and one of the plurality of entries of reference caller identification information, the spatial visual indicator device 206 activates a spatial visual indicator 208 including a plurality of illuminatable elements 210 according to one of the plurality of spatial visual indicator patterns corresponding to one of the plurality of reference caller identification information.

The spatial visual indicator patterns are selected to correspond to different stored reference caller identification information but the patterns are not correlated to the current caller identification information. Specifically, the reference caller identification information identifies, for example, a telephone number or IP address assigned to the party initiating the call (i.e., the calling party) but the spatial visual indicator device 206 does not merely display the telephone number or IP address as is typical with conventional "caller id." However, the entries of reference caller identification information have associated thereto visual patterns (e.g., chaser, blinking, strobing, flashing, etc.) that correspond or have been linked to specific ones of the stored or programmed reference caller identification information. For example, a current caller identification X may be received by the spatial visual indicator device 206 and correlate to a stored reference caller identification information X but the linked spatial visual indicator pattern may be a "chaser pattern of a fast cadence" where all of the illuminatable elements 210 are activated with the exception of one unilluminated element which is selected in a spinning sequence at a "fast" rate or cadence.

While a finite number of humanly discernable patterns is distinguishable, the various embodiments of the present invention find application to a visual caller identification methodology for "frequent" or "preferred" callers that may be readily visually identified by a user from a visual indicator that may be configured to present a more startling or alerting visual indicator than an alphanumeric readout that is generally unobtrusive and therefore requires more direct monitoring by a user to determine if in incoming call is detected.

Figure 4:
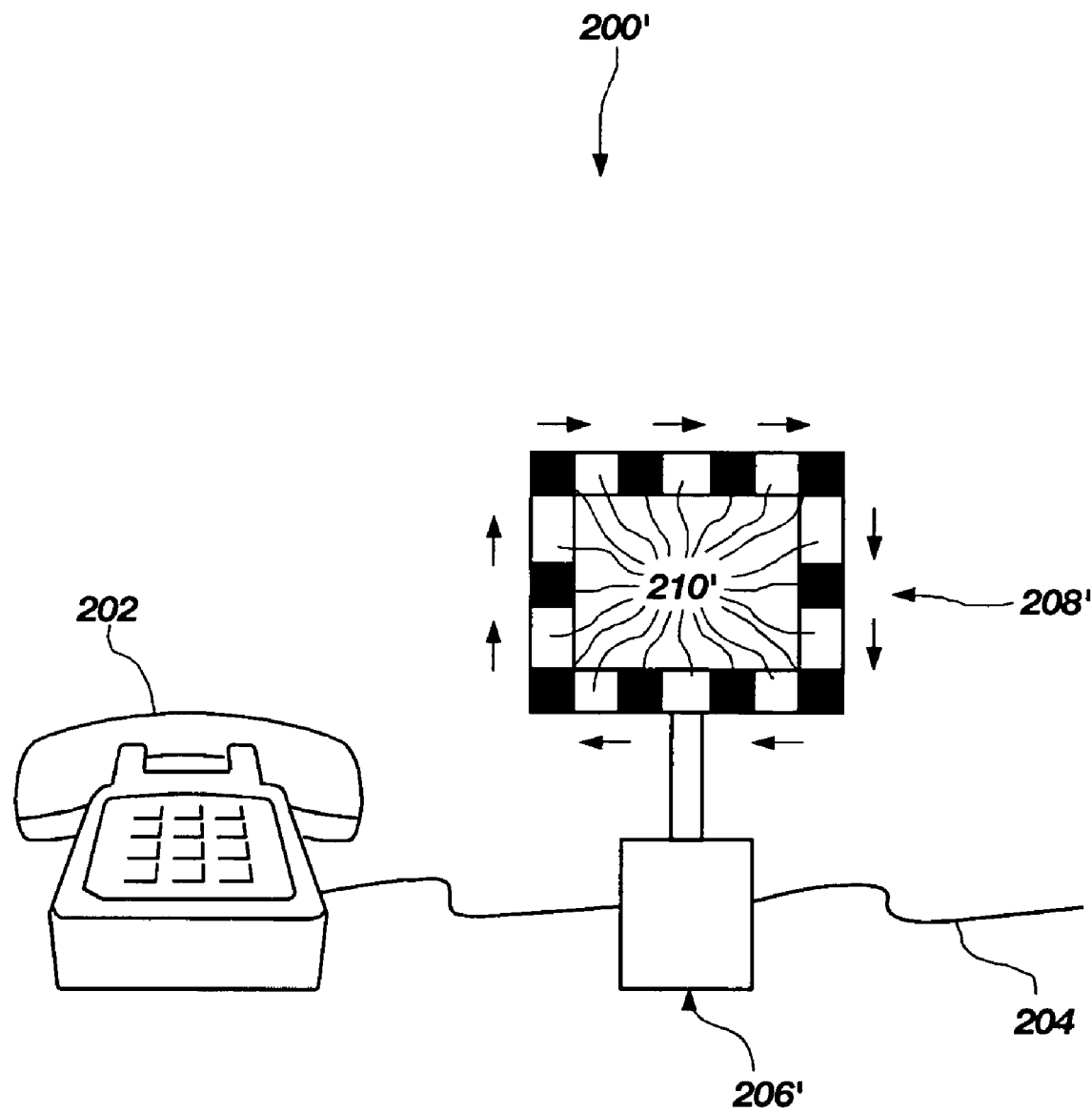
FIG. 4 illustrates a two dimensional visual indicator configured to provide a visual indication and convey information indicative of the specific activation of the device, in accordance with another embodiment of the present invention.
Figure 6:
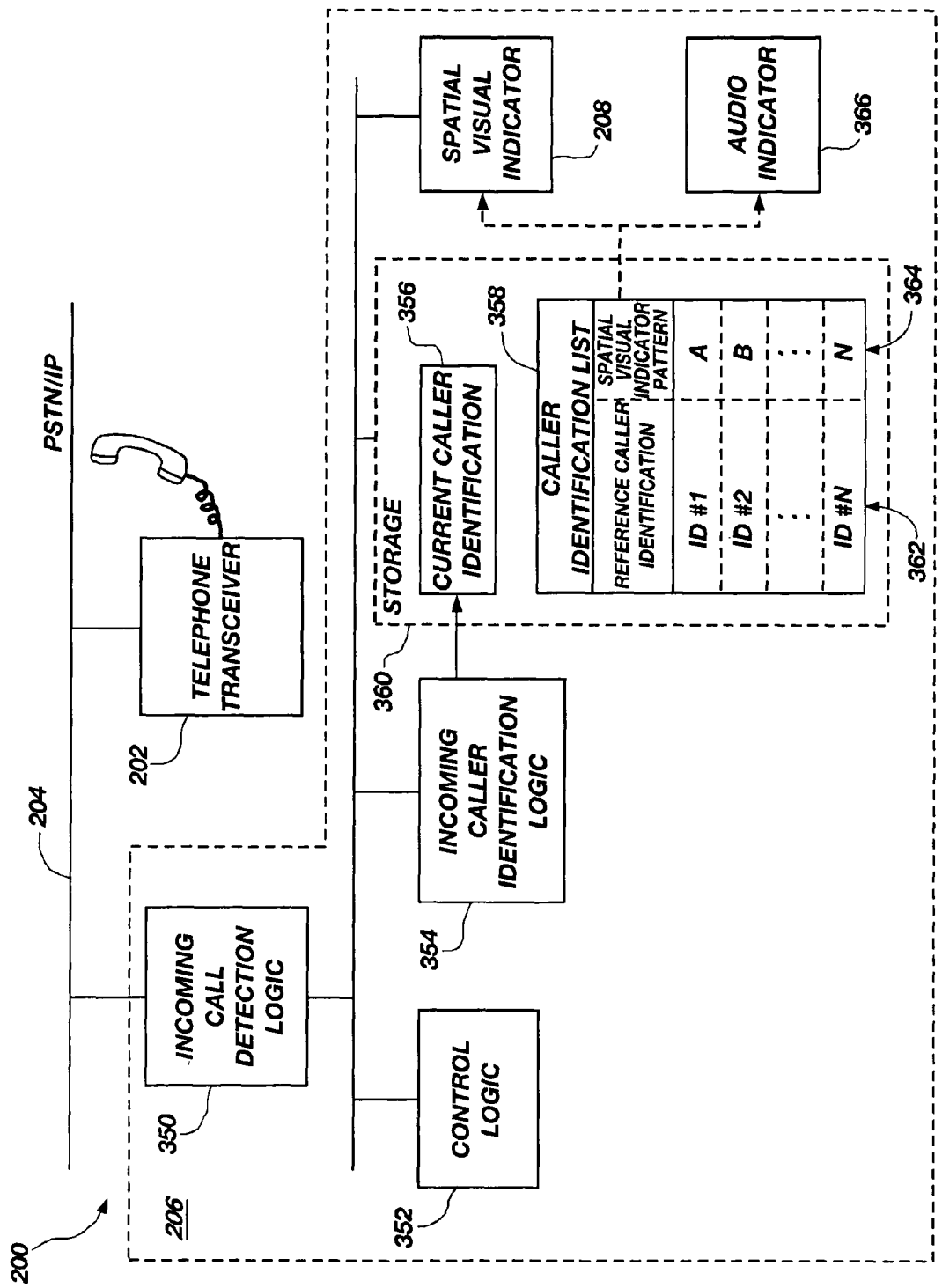
FIG. 6 is a functional block diagram of a visual indicator telephone system, in accordance with an embodiment of the present invention.

FIG. 4 illustrates a visual indicator telephone system, in accordance with another embodiment of the present invention. In the present embodiment, a visual indicator telephone system 200' including telephone 202 as described hereinabove. Also, coupled to the network 204 is a spatial visual indicator device 206' configured to identify an incoming call and correlate the incoming current caller identification information with entries of reference caller identification information stored in a caller identification list (FIG. 6). The visual indicator telephone system 200' further includes a spatial visual indicator 208' including a plurality of illuminatable elements 210' which may be activated according to one of the plurality of spatial visual indicator patterns corresponding to one of the plurality of reference caller identification information. In the present embodiment, the plurality of illuminatable elements 210' may be configured as part of an integrated display, such as a monitor or other array of display elements with the illuminatable elements 210' being configured as a grouping of lights or pixels that may be dedicated or shared for other display purposes. The programming to share access to illuminatable elements is understood by those of ordinary skill in the art.

Figure 5:
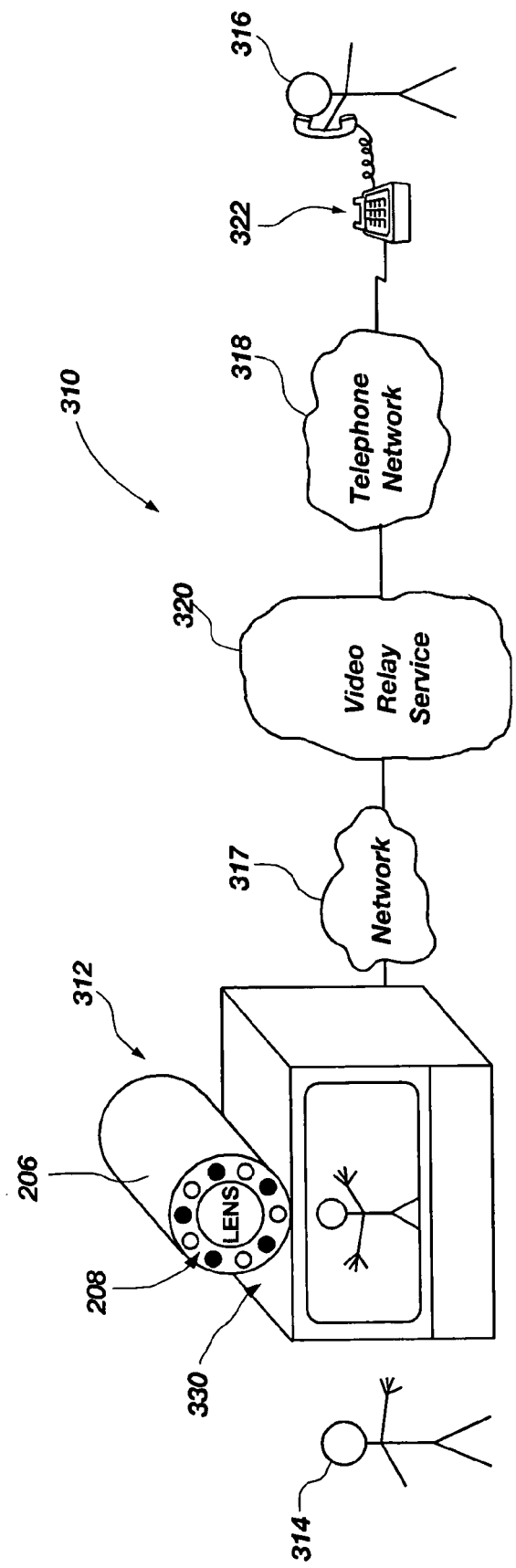
FIG. 5 is a block diagram of a communication system including a visual indicator telephone system, in accordance with an embodiment of the present invention.

FIG. 5 is a block diagram of a communication system including a visual indicator telephone system, in accordance with an embodiment of the present invention. The illustrated communication system is specifically drawn to facilitate a communication session between a hearing-impaired user and a hearing-capable user, but such an example is exemplary and is not to be considered as limiting. A communication system 310 enables a user 314 (e.g., a hearing-impaired user) to engage in conversation through the communication system 310 with a user 316 (e.g., a hearing-capable user). The hearing-impaired user 314 may exhibit varying levels of impairment including a voice-capable hearing-impaired user or a voice-incapable hearing-impaired user.

As stated, the voice capability of a hearing-impaired user may be used to determine the extent of translation or relay services relied upon during a communication session within communication system 310. A communication session between the users is facilitated through the use of various equipments, which are preferably coupled together using one or more networks including a telephone network such as the Public Switch Telephone Network (PSTN) and/or data networks such as Wide Area Networks, an example of which is the Internet. Alternatively, use of the term "telephone network" as used herein also contemplates networks which are compatible and configured to provide communications using digital standards, an example of which includes Voice over Internet Protocol (VoIP).

To interface a hearing-impaired user into a generally voice-based communication system, interpretive services (e.g., relay services) are employed allowing hearing-impaired users to communicate with an interpreter. If the hearing-impaired user is voice-incapable, then communication with the interpreter occurs primarily through the use of sign language. If the hearing-impaired user is predominantly voice-capable, then communication with the interpreter may be performed by the users expressing themselves through voice signals and "hearing" the interpreter through the use of sign language or other text-based interfaces. For voice-incapable hearing-impaired users, the sign language images are translated or interpreted by a relay service 320 providing a level of relay service herein defined as a "video relay service." When the sign language images are translated by the relay service 320 they are forwarded as voice information over a voice-based communication connection to the hearing-capable user 316.

One means for relaying the communicative expressions of a voice-incapable hearing-impaired user 314 within the communication system 310 incorporates the visual indicator telephone system 312, an example of which includes a video phone 330 and a spatial visual indicator device 206 which further includes a spatial visual indicator 208. When a call is placed by a user 316, the visual indicator telephone system receives the current caller identification information from one or more networks 317, 318 and indicates an incoming call. The spatial visual indicator device 206 captures the current caller identification information from the incoming call and compares the information with entries in a stored caller identification list (FIG. 6) to determine if a match with reference caller identification information exists.

The stored caller identification list is configured to store a plurality of entries of reference caller identification information and a corresponding respective plurality of entries of spatial visual indicator patterns. The spatial visual indicator patterns are uncorrelated to the current caller identification information. When a match is detected, the spatial visual indicator 208 is activated causing a plurality of illuminatable elements to flash or illuminate according to one of the plurality of spatial visual indicator patterns corresponding to one of the plurality of reference caller identification information.

When the communication session is established, the visual indicator telephone system 312 captures and displays, in video form, the communicative expressions exhibited by the voice-incapable hearing-impaired user 314. When user 314 is a voice-capable hearing-impaired user, the visual indicator telephone system 312 forwards voice communicative expressions exhibited by the voice-capable hearing-impaired user 314 to the relay service and directly to the hearing-capable user 316. For a voice-incapable hearing-impaired user, the sign language and/or body language may be interpreted or translated by relay service 320. The hearing-capable user 316 interacts in a conventional manner with relay service 320 through the use of voice-based dialog conveyed over a conventional voice phone 322.

The various devices, such as visual indicator telephone system 312 and voice phone 322, are coupled to relay service 320 using one or more networks 317, 318. By way of example, and not limitation, enhanced bandwidth requirements of various network devices may be better accommodated by providing high bandwidth networks and connections thereto through various enhanced-bandwidth networking technology including DSL, Cable, Ethernet, etc. Network 318 may be implemented according to the standards and bandwidth requirements of voice phone 322 and, as stated, may further be implemented according to digital telephony standards including VOIP.

FIG. 6 is a functional block diagram of a visual indicator telephone system, in accordance with an embodiment of the present invention. A visual indicator telephone system 200 is configured for coupling with a network 204, an example of which includes PSTN and IP-based networks. Visual indicator telephone system 200 includes general telephony capability illustrated herein as a telephone 202. Telephone 202 facilitates full duplex conversation between a calling party and a called party. In one embodiment, telephone 202 may be configured as a conventional telephone while in a separate embodiment, telephone 202 may be configured as a videophone for facilitating an exchange of sign language or other hearing-impaired signaling techniques.

Visual indicator telephone system 200 further includes a spatial visual indicator device 206 which further includes incoming call detection logic 350 and control logic 352 configured to identify an incoming call. Spatial visual indictor device 206 further includes incoming caller identification logic 354 configured to correlate the incoming current caller identification information 356 with entries in a stored caller identification list 358 retained in storage 360. The stored caller identification list 358 is configured to store a plurality of entries of reference caller identification information 362 and a corresponding respective plurality of entries of spatial visual indicator patterns 364 which are uncorrelated to the incoming current caller identification information 356. The spatial visual indicator patterns 364 are mapped or assigned to reference caller identification information 364 but the spatial visual indicator patterns do not render a specific visual pattern that contains the information of the current caller identification information.

When the spatial visual indicator device 206 detects a match between the current caller identification information and one of the plurality of entries of reference caller identification information, the spatial visual indicator device 206 activates a spatial visual indicator 208 including a plurality of illuminatable elements 210 (FIGS. 3-4) according to one of the plurality of spatial visual indicator patterns 364 corresponding to one of the plurality of reference caller identification information 362.

In yet another embodiment of the present invention, the visual indicator telephone system 200 may further include an audio indicator 366 which receives a unique signal such as the spatial visual indicator pattern for generating a unique audio pattern in conjunction with the display of the mapped spatial visual indicator pattern 364 corresponding to an assigned to reference caller identification information 362. Supplementing the expression of the spatial visual indicator with a corresponding audio indicator may augment the sensory perception of a partially hearing-impaired user or may also supplement call notification for a mixed hearing-impaired and hearing-capable environment.

FIG. 7 is a detailed diagram of exemplary data elements within a caller identification list, in accordance with an embodiment of the present invention. As stated, the stored caller identification list 358 is configured to store a plurality of entries of reference caller identification information 362 and a corresponding respective plurality of entries of spatial visual indicator patterns 364 which are uncorrelated to the incoming current caller identification information 356. The spatial visual indicator patterns 364 are mapped or assigned to reference caller identification information 362 but the spatial visual indicator patterns do not render a specific visual pattern that contains the information of the current caller identification information. Examples of spatial visual indicator patterns 364 include alerting patterns that are visually distinguishable according to various factors such as strobe rate, rotation or chasing rate, ratio of on and off illuminatable elements, relational position of on and off illuminatable elements, etc.

A device, system and method of indicating an incoming call has been described. Although the present invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A caller identification visual alerting device, comprising:
    incoming caller identification logic configured to capture current caller identification information from an incoming call;
    a stored caller identification list configured to store a plurality of entries of reference caller identification information and a corresponding respective plurality of entries of non-alphanumeric spatial visual indicator patterns, the reference caller identification information for matching with the current caller identification information and the spatial visual indicator patterns being uncorrelated to the current caller identification information; and
    a spatial visual indicator including an arrangement of illuminatable elements having at least one illuminatable element two-dimensionally offset from at least one other illuminatable element, the spatial visual indicator configured to activate a plurality of the illuminatable elements according to one of the plurality of spatial visual indicator patterns corresponding to one of the plurality of reference caller identification information when matched to the current caller identification information.

2. The caller identification visual alerting device of claim 1, wherein the incoming call detection logic is configured to compatibly couple with a public switched telephone network for detecting the incoming call.

3. The caller identification visual alerting device of claim 1, wherein the incoming call detection logic is configured to compatibly couple with an IP network for detecting the incoming call.

4. The caller identification visual alerting device of claim 1, wherein the incoming call detection logic is configured to receive the incoming call as a video call on a video phone.

5. The caller identification visual alerting device of claim 4, wherein the spatial visual indicator is in line of sight when operating the video phone.

6. The caller identification visual altering device of claim 1, wherein spatial visual indicator patterns correlate to and are independent of the caller identification information.

7. The caller identification visual altering device of claim 1, further comprising an audio indicator responsive to the one of the plurality of spatial visual indicator patterns corresponding to one of the plurality of reference caller identification information when matched to the current caller identification information.

8. The caller identification visual altering device of claim 1, wherein the spatial visual indicator includes at least one illuminatable element vertically offset and horizontally offset from at least one other illuminatable element.

9. The caller identification visual altering device of claim 1, wherein the spatial visual indicator patterns are each color independent.

10. The caller identification visual altering device of claim 1, wherein the spatial visual indicator includes a continuously linear arrangement of illuminatable elements.

11. A visual caller identification telephone, including:
    a telephone transceiver configured to receive an incoming call; and
    a caller identification visual alerting device, including:
        incoming caller identification logic configured to capture current caller identification information from an incoming call;
        a stored caller identification list configured to store a plurality of entries of reference caller identification information and a corresponding respective plurality of entries of non-alphanumeric spatial visual indicator patterns, the reference caller identification information for matching with the current caller identification information and the spatial visual indicator patterns being uncorrelated to the current caller identification information; and
        a spatial visual indicator including an arrangement of illuminatable elements having at least one illuminatable element two-dimensionally offset from at least one other illuminatable element, the spatial visual indicator configured to activate a plurality of the illuminatable elements according to one of the plurality of spatial visual indicator patterns corresponding to one of the plurality of reference caller identification information when matched to the current caller identification information.

12. The visual caller identification telephone of claim 11, wherein the incoming call detection logic is configured to compatibly couple with a public switched telephone network for detecting the incoming call.

13. The visual caller identification telephone of claim 11, wherein the incoming call detection logic is configured to compatibly couple with an IP network for detecting the incoming call.

14. The visual caller identification telephone of claim 11, wherein the incoming call detection logic is configured to receive the incoming call as a video call on a video phone.

15. The visual caller identification telephone of claim 14, wherein the spatial visual indicator is in line of sight when operating the video phone.

16. The visual caller identification telephone of claim 11, wherein spatial visual indicator patterns correlate to and are independent of the caller identification information.

17. The visual caller identification telephone of claim 11, further comprising an audio indicator responsive to the one of the plurality of spatial visual indicator patterns corresponding to one of the plurality of reference caller identification information when matched to the current caller identification information.

18. The visual caller identification telephone of claim 11, wherein the spatial visual indicator pattern includes at least one illuminatable element in an on state and at least one illuminatable element in an off state.

19. The visual caller identification telephone of claim 11, wherein the spatial visual indicator is configured to activate at least one illuminatable element and simultaneously deactivate at least one other illuminatable element according to one of the plurality of spatial visual indicator patterns.

20. A method of indicating an incoming call, comprising:
    capturing current caller identification information from an incoming call;

comparing, with a stored caller identification list configured to store therein a plurality of entries of reference caller identification information and a corresponding respective plurality of entries of non-alphanumeric spatial visual indicator patterns, the current caller identification information with the plurality of entries of reference caller identification information and the spatial visual indicator patterns being uncorrelated to the current caller identification information; and activating a plurality of illuminatable elements according to one of the plurality of spatial visual indicator patterns corresponding to one of the plurality of reference caller identification information when the current caller identification information matches the one of the plurality of reference caller identification information, wherein at least one illuminatable element of the plurality is two-dimensionally offset from at least one other illuminatable element of the plurality.

21. The method of claim 20, further comprising:

storing at least one reference caller identification information; and associating at least one spatial visual indicator pattern with the at least one reference caller identification information.

22. The method of claim 20, further comprising receiving the current caller identification information from one of a public switched telephone network and an IP network.

23. The method of claim 20, wherein each of the plurality of illuminatable elements is shared with another display device.

24. The method of claim 20, further comprising integrating the plurality of illuminatable elements with a telephone.

25. The method of claim 20, further comprising activating an audio indicator according to the one of the plurality of spatial visual indicator patterns corresponding to one of the plurality of reference caller identification information when the current caller identification information matches the one of the plurality of reference caller identification information.

26. The method of claim 20, wherein activating a plurality of illuminatable elements in at least a two-dimensional arrangement according to one of the plurality of spatial visual indicator patterns comprises activating a plurality of illuminatable elements in at least a two-dimensional arrangement according to one of a chaser pattern, a blinking pattern, a strobing pattern, and a flashing pattern.

* * * * *